United States Patent
Davis et al.

(10) Patent No.: US 7,281,068 B2
(45) Date of Patent: Oct. 9, 2007

(54) WIRELESS-BOOT DISKLESS MOBILE COMPUTING

(75) Inventors: Mark C. Davis, Durham, NC (US);
Matthew J. Kalos, Tucson, AZ (US);
Richard V. Kisley, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 10/891,559

(22) Filed: Jul. 15, 2004

(65) Prior Publication Data
US 2006/0015931 A1    Jan. 19, 2006

(51) Int. Cl.
*G06F 13/00* (2006.01)
*G06F 15/177* (2006.01)
*H04L 9/14* (2006.01)

(52) U.S. Cl. .............. 710/62; 713/2; 713/168; 713/171; 709/219; 726/6; 726/28; 726/29

(58) Field of Classification Search ............ None
See application file for complete search history.

(56) References Cited

U.S. PATENT DOCUMENTS

| | | |
|---|---|---|
| 5,349,643 A | 9/1994 | Cox et al. |
| 5,872,968 A | 2/1999 | Knox et al. |
| 5,896,499 A | 4/1999 | McKelvey |
| 6,141,705 A | 10/2000 | Anand et al. |
| 6,189,100 B1 * | 2/2001 | Barr et al. .............. 713/182 |
| 6,304,899 B1 | 10/2001 | Cromer et al. |
| 6,463,537 B1 | 10/2002 | Tello |
| 6,986,040 B1 * | 1/2006 | Kramer et al. ............. 713/155 |
| 2003/0028790 A1 | 2/2003 | Bleumer et al. |
| 2003/0061505 A1 | 3/2003 | Sperry et al. |

OTHER PUBLICATIONS

Research Disclosure Dec. 1999:428:428122: Bootstrapping LAN Access Using PPP Configuration Via OBEX Object Transfer; Kenneth Mason Publications Ltd.
Research Disclosure May 1999:421:421129: Personal Computer Memory Card International Association (PCMCIA) Interface And Network Personal Computer; Kenneth Mason Publications Ltd.
IBM Technical Disclosure Bulletin vol. 35, No. 7, "Remote Program Load of a Diskless Initial Microcode Load Computer System," Dec. 19992.
IBM Technical Disclosure Bulletin vol. 34, No. 108, "Remote Initial Program Load of a Diskless Computing Device via a Standard Serial or Parallel Port," Mar. 1992.

* cited by examiner

*Primary Examiner*—Ilwoo Park
(74) *Attorney, Agent, or Firm*—Quarles & Brady LLP (57) ABSTRACT

A disk management server ("DMS"), to manage a remote storage device; a wireless communication network; and a mobile computer create a system for secure remote booting of a mobile computer's operating system. To facilitate access to remote boot code, a multiple connection disk management server utilizes a trusted connection to negotiate communication security and an untrusted connection for transferring data once communication security has been established. The trusted connection is established through a physically securable interface, such as a wired network or line-of-site wireless network, e.g., infrared. Successful negotiation of communication security produces a security key that can be utilized to secure information exchange over the untrusted network. The untrusted connection may utilize any standard wireless communication protocol such as IEEE 802.11b.

30 Claims, 7 Drawing Sheets

WIRELESS-BOOT DISKLESS MOBILE COMPUTING

BACKGROUND OF THE INVENTION

1. Field of the Invention

This invention is related in general to the wireless computing. In particular, the invention consists of a system for securely booting from and operating from a remote data storage device.

2. Description of the Prior Art

Mobile computing has become extremely popular with today's computer users. The design of today's mobile computers is a trade-off between performance, size, weight, battery life, and cost. One limiting factor is the cost, weight, size, and power requirements of memory storage devices, such as hard disk drives, for storing operating systems and software applications. However placing a memory storage device within a mobile computer creates a potential for a single-point failure, resulting in the loss of all data in the event of damage or theft and an inability to boot the computer, i.e., load the operating system into working memory.

Figure 1:
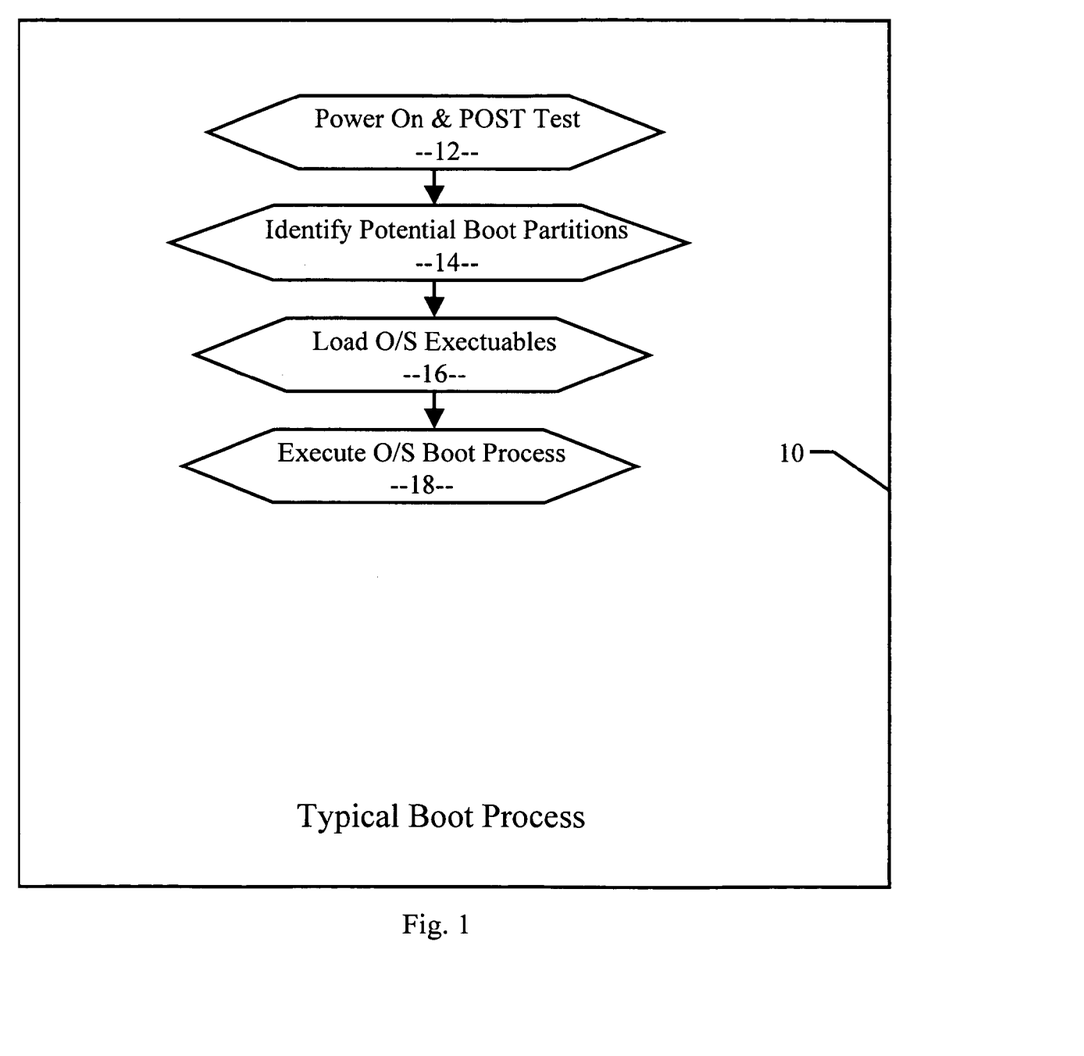
FIG. 1 is a flow-chart illustrating a traditional computer boot process.

A primary function of a local memory storage device is to hold start-up instructions for a computer's boot process. A typical boot process 10 is illustration in the flow chart of FIG. 1. In step 12, the mobile computer is powered-on and a power-on self test ("POST") is executed. The potential locations for an operating system boot partition are identified in step 14. If an operating system boot partition may be located on a PCI adapter, a basic input/output system ("BIOS") for the peripheral communications interconnect local bus ("PCI") adapter is loaded into working memory in step 16. Once the operating system boot partition has been located, the operating system's executable instructions are loaded into working memory (step 16) and the boot process is turned over to the operating system (step 18). Finally, communication standards, such as internet protocols ("IP"), are configured to allow the computer to communicate with remote devices.

A potential solution to single-point failure is to transfer information to remote memory storage devices such a disk servers or tape libraries. A common method of communicating with these off-system devices is to utilize a communication network. Typically, such communication networks have employed local-area networks ("LANS"), wide-are networks ("WANS"), or storage-area networks ("SANS"). These networks have traditionally utilized networks conforming to IEEE standards, such as IEEE 802.3 (Ethernet). Using the IEEE 802.11b standard, mobile computers may be connected to the base stations through the transmission and reception of radio signals. Additionally, the IEEE 802.11b specification allows for the wireless transmission of approximately 11 million bits per second ("Mbps") of digital data at indoor distances up to a few hundred feet and outdoor distances up to tens of miles on a 2.4 gigahertz ("GHz") radio broadcast band.

The wireless broadcast communication networks are primarily used for Internet protocol (IP) based communication, but can be used for just about any type of digital communication. The area of effective transmission and reception depends on transmission strength, reception antennae, and line-of-sight obstructions.

Utilizing these wireless communication networks, mobile computers can easily access software applications from and store data to remote storage devices. However, booting a computer and loading an operating system from a remote device is more problematic. Additionally, providing a secure connection absent a local memory storage device can be difficult.

In U.S. Pat. No. 6,141,705, Sanjay Anand et al. disclose offloading processors tasks, including data encryption and message circulation. However, Anand's disclosed invention is not directed to mobile computing and does not discuss booting a device absent a local memory storage device. It would be advantageous to have a system for providing a secure connection between a mobile computer and a remote memory storage device that includes an ability to load boot instructions from a remote memory storage device.

In U.S. Pat. No. 5,872,968, Richard I. Knox et al. disclose a data processing network with a client connected to a server. The client issues a boot request ("RPL") and the server sends bootstrap code to the client. The bootstrap code is loaded into client memory and causes the client to issue a bootstrap request from a second server. The system disclosed by Knox is an attempt to boot a client computer in a mixed network environment. While potentially effective in allowing a boot process to occur in a mixed network protocol environment, Knox's invention utilizes conventional encryption techniques to provide security. It would be advantageous to have a mixed security model environment to resolve a single network unsecured boot process.

In U.S. Pat. No. 5,896,499, Mark A. McKelvey discloses an embedded security processor used in conjunction with a main processor to provide security for a computer system that is accessible over a computer network. McKelvey's system includes a security processor, preferably an expansion card plugged into the computer system's data bus, that secures access from one network to another and may optionally include a firewall. However, McKelvey does not teach a method for securing the delivery of a boot image to a mobile computer sans memory storage device. Accordingly, it would be advantageous to utilize a disk management session ("DMS") for securing a remote boot process using a combination of trusted and untrusted connections.

SUMMARY OF THE INVENTION

The invention disclosed herein utilizes a disk management device, such as a disk server, to manage a remote storage device; a wireless communication network; and a mobile computer to create a system for secure remote booting of the mobile computer's operating system. To facilitate access to remote boot code, a multiple connection disk management session utilizes a trusted connection to negotiate communication security and an untrusted connection for transferring data once communication security has been established.

The trusted connection is established through a physically securable interface, such as a wired network or line-of-site wireless network, e.g., infrared. Successful negotiation of communication security produces a security key that can be utilized to secure information exchange over the untrusted network. The untrusted connection may utilize any standard wireless communication protocol such as IEEE 802.11b.

The trusted connection is primarily used for authentication handshaking while the untrusted connection is utilized for delivery of the bootstrap code. Once the untrusted connection has been established, the trusted connection may be terminated. One advantage of this invention is the integration of two network connections, one trusted and one untrusted, into a single secure boot session for a mobile computer lacking a local memory storage device.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

DESCRIPTION OF THE PREFERRED EMBODIMENTS

This invention is based on the idea of utilizing a remote boot system to allow a mobile computer sans local memory storage device to negotiate a communication session and receive bootstrap code. A multi-connection session including a trusted connection and an untrusted connection may be utilized to ensure the communication session is secure. Once a secure session has been established, the trusted connection may be disconnected and the untrusted connection may be used to provide the requested bootstrap code.

The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays ("FPGAs"), application-specific integrated circuits ("ASICs"), complex programmable logic devices ("CPLDs"), programmable logic arrays ("PLAs"), microprocessors, or other similar processing devices.

Figure 2:
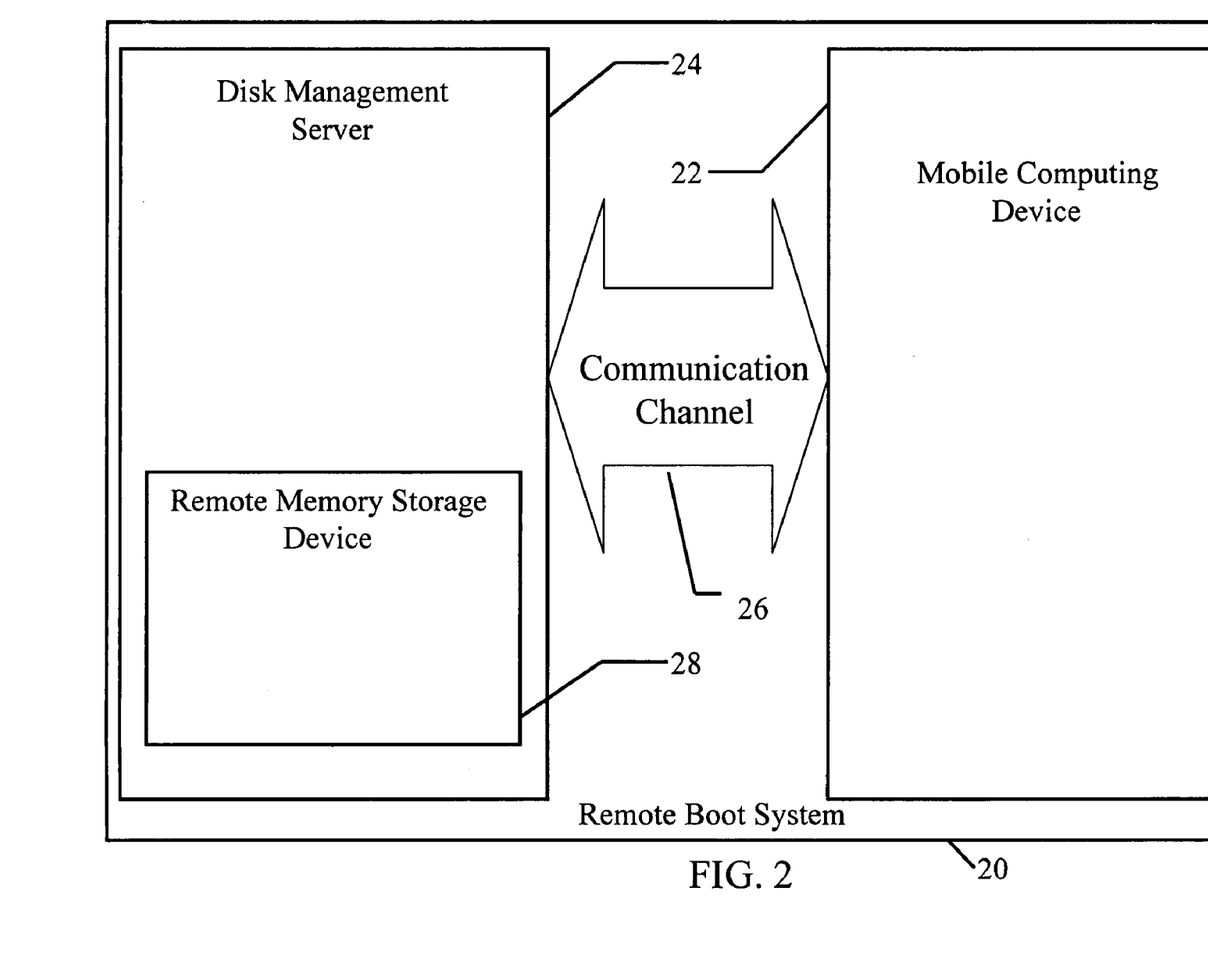
FIG. 2 is a block diagram of a remote boot system, wherein a mobile computer lacks a local memory storage device, including a disk management server, a remote connection, and the mobile computer.

Referring to figures, wherein like parts are designated with the same reference numerals and symbols, FIG. 2 is a block diagram of a remote boot system 20 including a mobile computer 22, a disk management server ("DMS") 24, and a remote communication channel 26. The mobile computer optionally may have a local memory storage device, such as a hard disk drive. However, the remote boot system 20 is designed to access bootstrap code from a remote memory storage device 28. The mobile computer 22 may be a laptop computer, personal digital assistant ("PDA"), e-mail terminal, or other similar device.

Figure 2A:
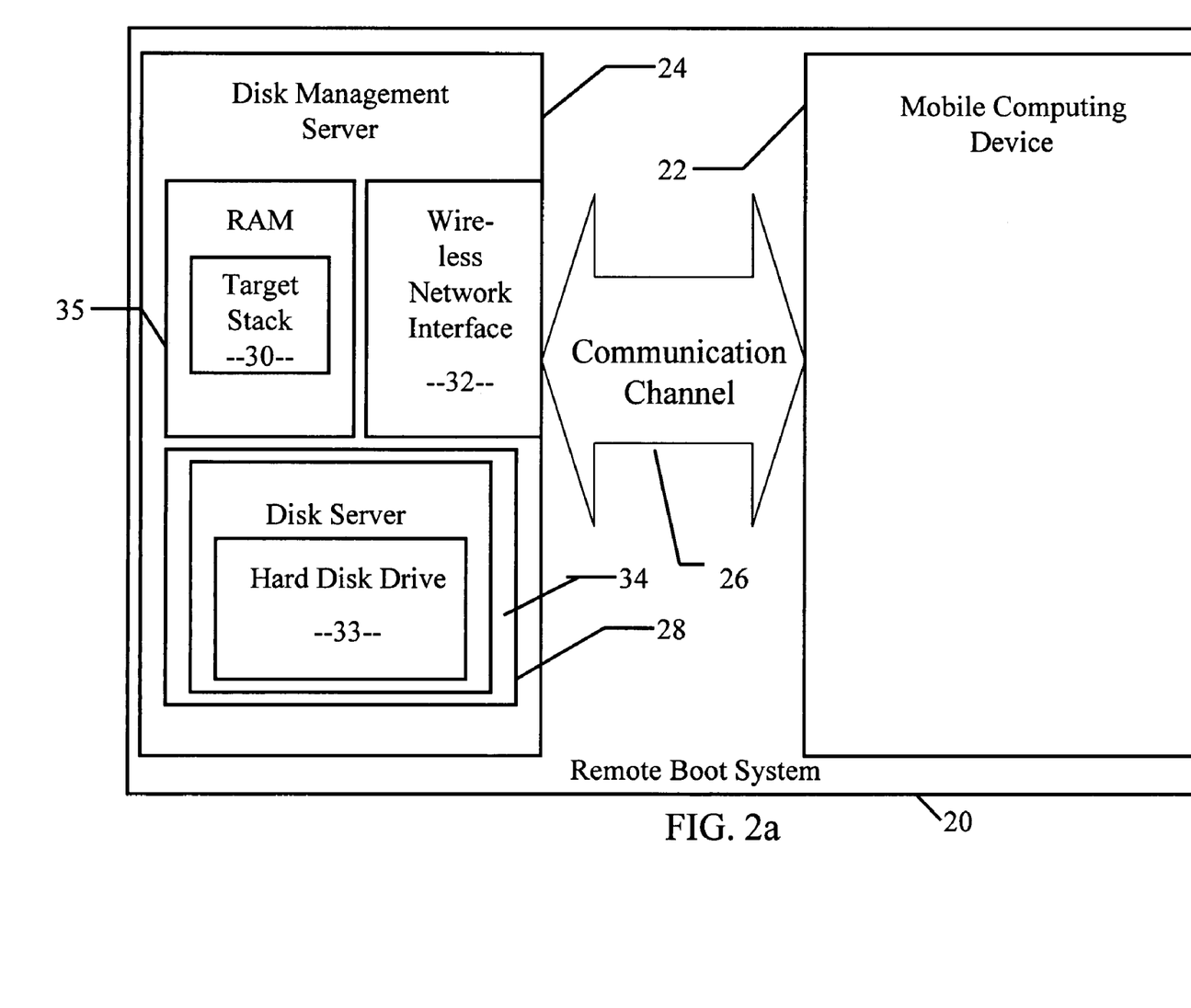
FIG. 2a is a block diagram of the disk management server of FIG. 2, including a target stack and a wireless network interface.

The DMS 24 is further illustrated in the block diagram of FIG. 2a, including a target stack 30 and a wireless network interface 32. The remote memory storage device 28 is a hard disk drive 33 residing within a disk server 34. Optionally, the remote memory storage device 28 may be an optical memory device, a tape cartridge, a redundant array of inexpensive disks ("RAID), or other similar device. In one embodiment of the invention, the target stack 30 resides within a random access memory ("RAM") device 35, a flash-ram memory device, or other similar memory device.

Figure 2B:
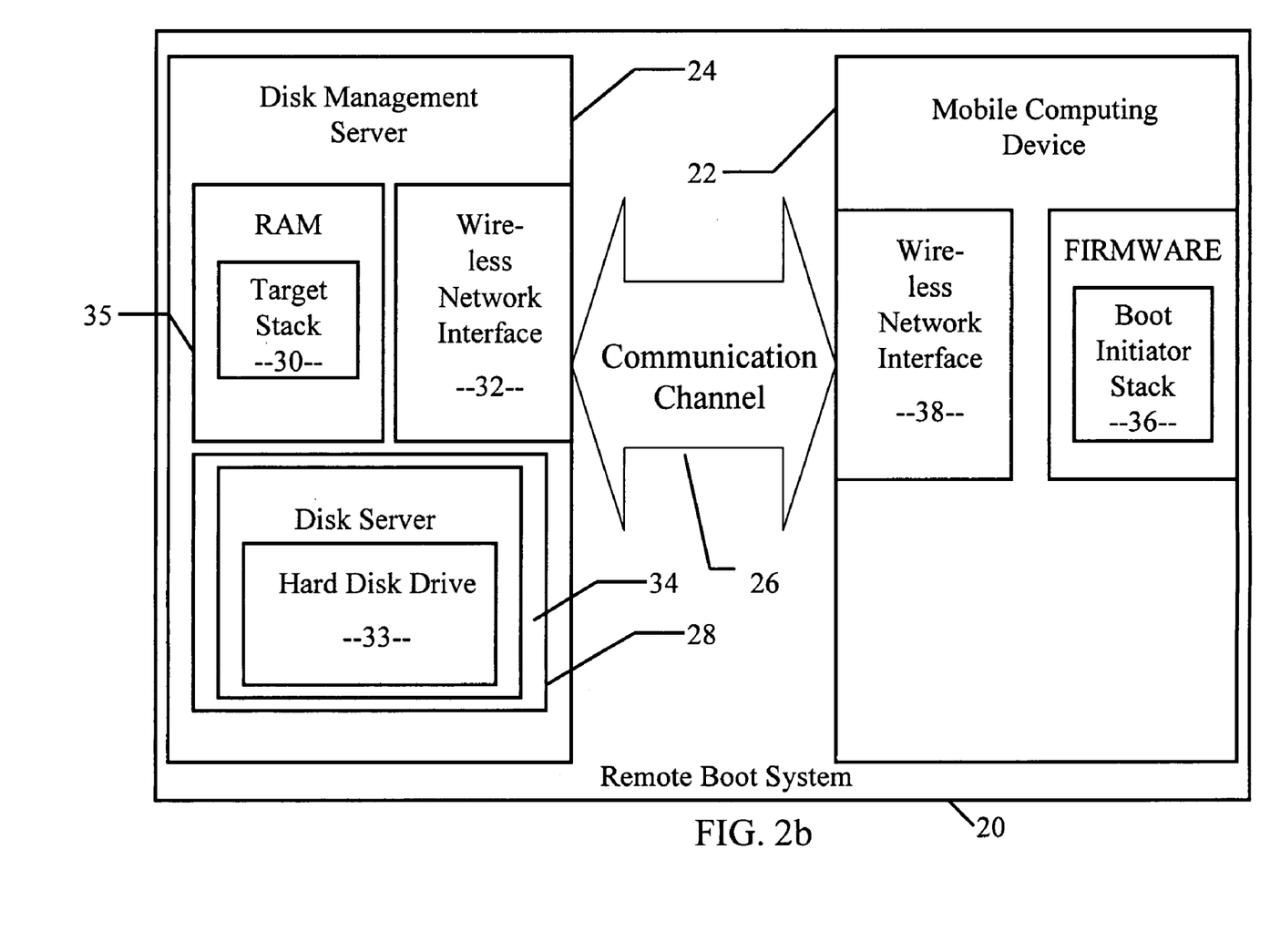
FIG. 2b is a block diagram of the mobile computer of FIG. 2, including a boot initiator stack and a wireless network interface.

The block diagram of FIG. 2b more fully illustrates the mobile computer 22, including a boot initiator stack 36 and a second wireless network interface 38. The wireless network interface of the DMS 24 and the second wireless network interface of the mobile computer 22 combine to form the remote communication channel 26.

Figure 3:
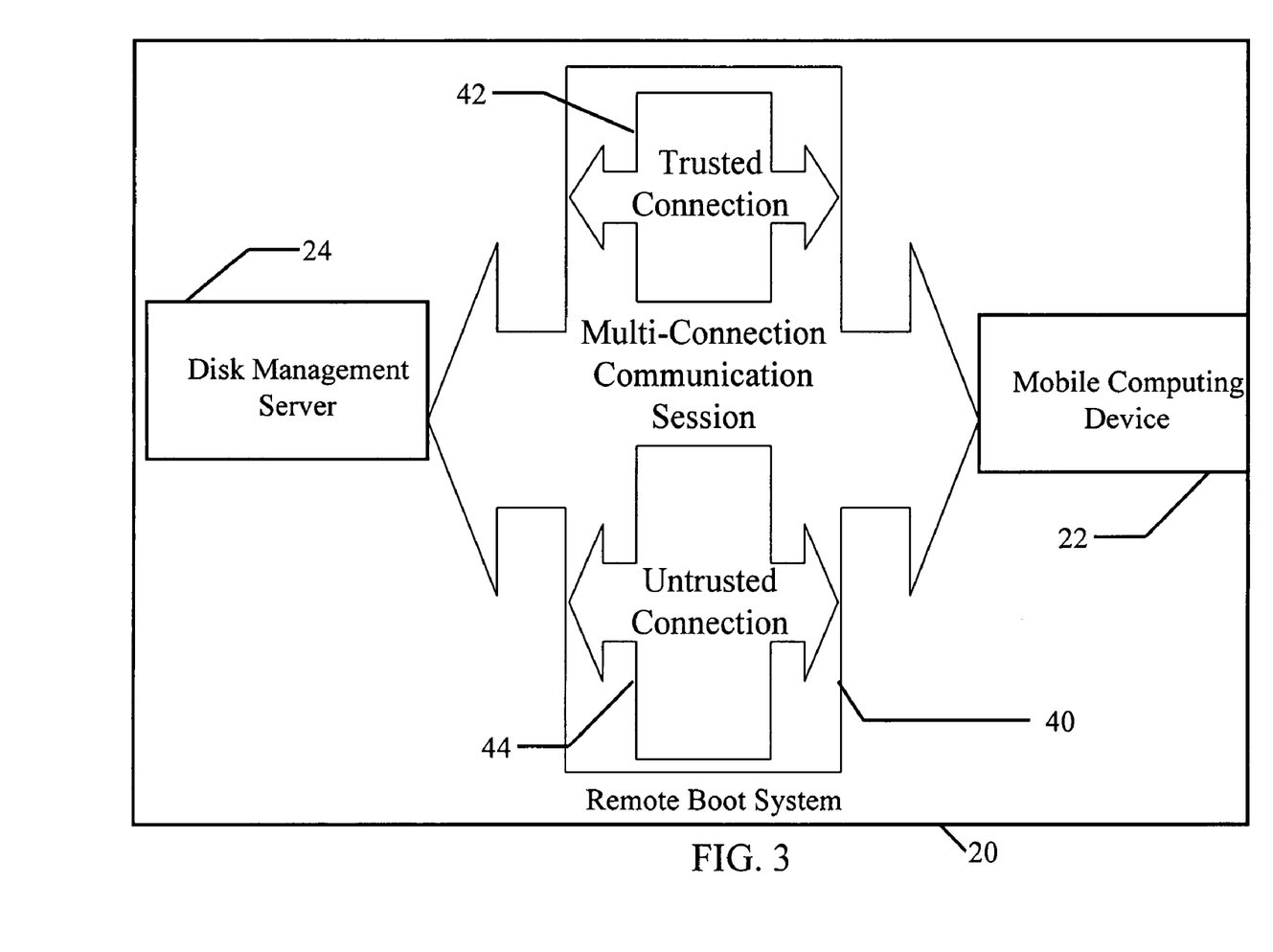
FIG. 3 is a block diagram of the remote boot system of FIG. 2, wherein the remote connection is a multi-connection communication session including a trusted connection and an untrusted connection.

One of the problems with booting a mobile computer 22 without a local memory storage device is that software applications used to create secure communication session normally reside on a local memory storage device, such as a hard disk drive. The process of creating a secure communication session with a DMS utilizing transmission control protocol ("TCP") Internet protocols over a wireless network is, in and of itself, not necessarily a secure process. To overcome this problem, a multi-connection communication session 40 is illustrated in FIG. 3, including a trusted connection 42 and an untrusted connection 44. The trusted connection is one that allows a user of the remote boot system 20 to physically control which DMS 24 devices are allowed to communicate with the mobile computer 22. This may be accomplished utilizing a physical connection, such as an Ethernet cable, or through a line-of-site transmitter/receiver such as an infrared communication device.

The untrusted connection is any network connection conforming to standard communication protocols, such as Ethernet, Wireless, or Internet. Once a secure encryption key has been negotiated between the mobile computer 22 and the DMS 24, the untrusted connection 44 becomes a secure communication datapath. Once this secure communication datapath has been established, the trusted connection may be terminated, allowing the mobile computer to move outside the area encompassed by the trusted connection 42.

Figure 4:
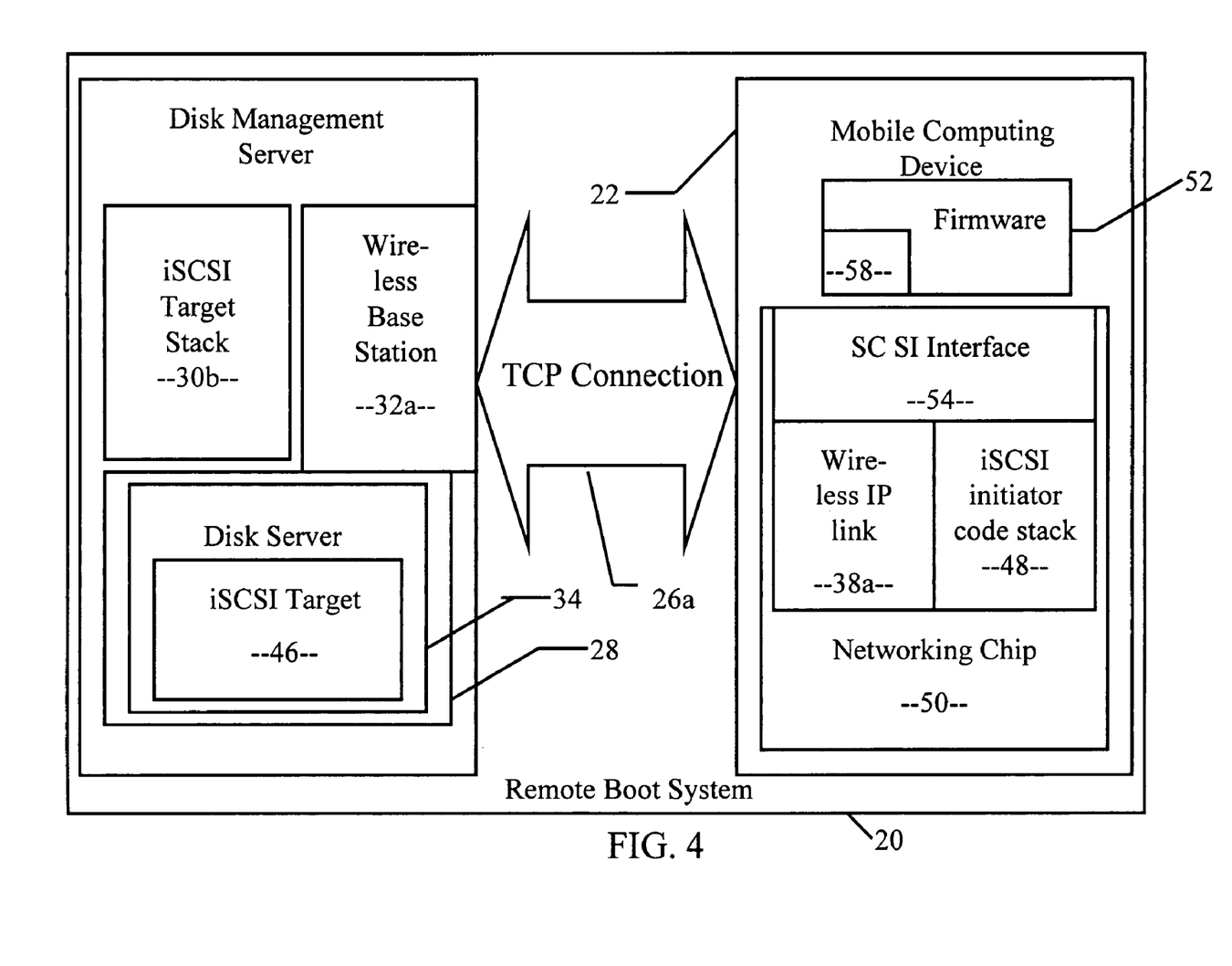
FIG. 4 is a block diagram of the remote boot system of FIG. 2, wherein the disk management server includes a disk server utilized as an Internet small computer system interface ("iSCSI") target, an iSCSI target stack; the remote connection includes a wireless base station and a wireless internet protocol ("IP") link; and the mobile computer includes an iSCSI initiator code stack.

A more detailed embodiment of the remote boot system 20 is illustrated in the block diagram of FIG. 4. The DMS 24 includes a disk server 34 acting as a an Internet small computer system interface ("iSCSI") target 46 and an iSCSI target stack 30b. The remote communication channel 26 includes a wireless base station 32a and a wireless IP link 38a. Additionally, the mobile computer includes an iSCSI initiator code stack 48.

SCSI is an interface system that provides access services for peripheral input/output device such as hard disk drive, optical disks, and CD-ROMs. SCSI is usually implemented in host adapters and provide a shared bus for the peripheral devices. Software applications make service requests to SCSI which, in turn, issues instructions to logical units. The iSCSI specification allows mapping of traditional SCSI into the TCP/IP communication protocol. This allows remote devices to connect with a SCSI device across a network and perform block transfer directly over the network. Communication between the target 46 and the initiator 48 occurs over a TCP connection 26*a*. In other embodiments of the invention, other similar technologies such as universal serial bus ("USB"), IEEE 1394 ("Firewire"), or Fibre Channel may be used.

In one embodiment of the invention, the disk server 34 acts as the iSCSI target 46 while managing data storage. Additionally, the Wireless IP link 38*a* and the iSCSI initiator code stack 48 reside on the same networking chip 50. Firmware 52 controls the networking chip 50, instructing it to initialize a configuration that provides a SCSI interface 54 to the DMS 24. It is intended that the remote boot system 20 has established a virtual disk connection by the time the mobile computer's motherboard (not shown) initialization is complete.

A secured communication session may be established utilizing the IEEE 802.11x standard. Another option is to use a boot-time password 56 inserted into the firmware to generate a security key 58 that may be transmitted over the trusted connection 42 to the DMS 24. This key would be used to negotiate a secure communication session between the mobile computer 22 and the DMS 24. Once this secure communication session has been established, the trusted connection 42 may be terminated and the bootstrap code may be transmitted over the untrusted connection 44.

Figure 5:
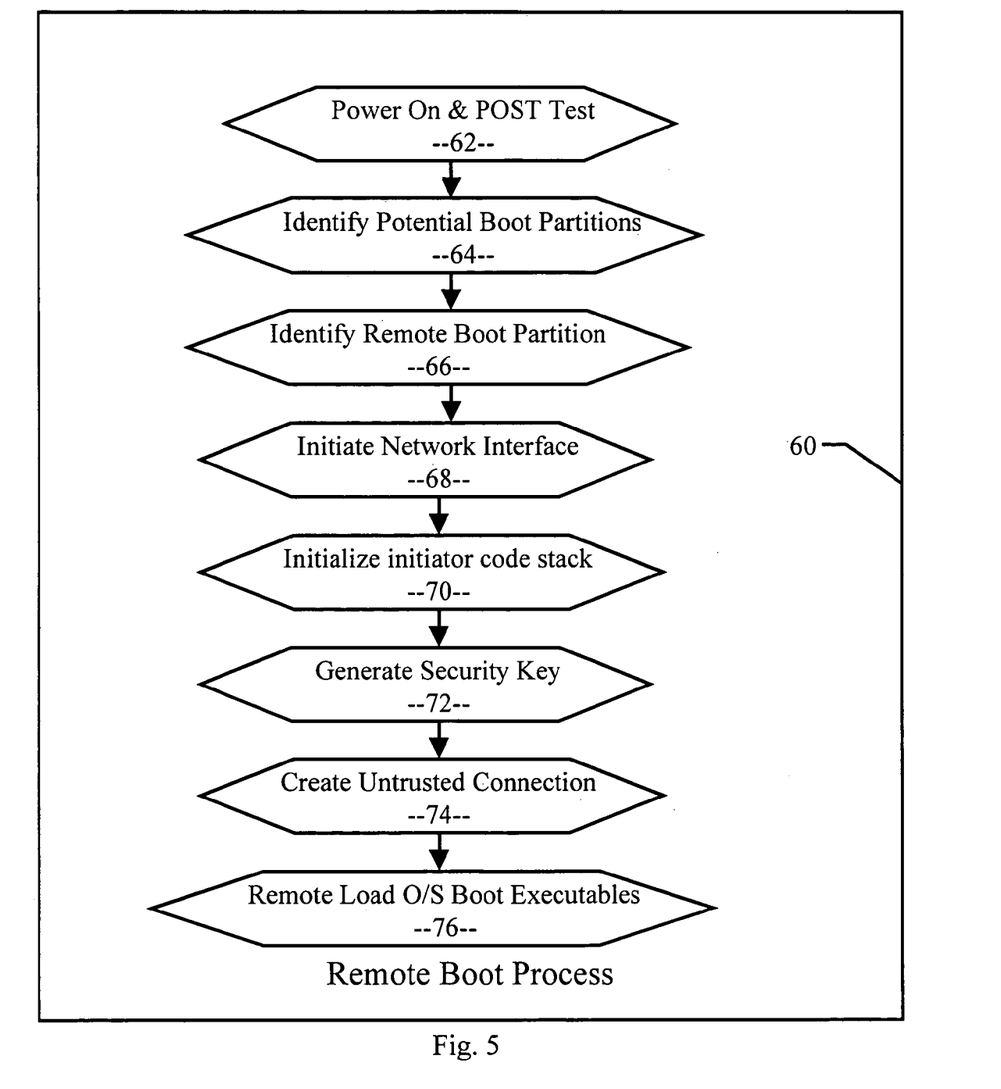
FIG. 5 is a flow-chart illustrating a remote computer boot process utilizing the remote boot system of FIG. 4.

One embodiment of the remote boot process 60 is illustrated in FIG. 5. In step 62, the mobile computer 22 is powered-on and a power-on self test ("POST") is executed. The potential locations for an operating system boot partition are identified in step 64. In step 66, a determination is made that the bootable partition resides on a remote storage device, such as the DMS 24. A network interface is initiated by the networking chip 50 (step 68) and the iSCSI initiator code stack 48 is initialized (step 70). Secure private authentication occurs in step 70 producing a security key 58.

The iSCSI target 46 is located in step 72 either by using a pre-stored or hand-keyed configuration or through dynamic configuration of the IP address and login information. In step 74, an initialization handshake occurs over the untrusted connection 44. A firmware call initiates the loading of operation system executable instructions from the DMS 24 in step 76 and boot control is turned over to the operating system.

Those skilled in the art of making remote boot systems may develop other embodiments of the present invention. For example, a direct cable connection may be utilized as a trusted connection 42 or the Internet may be utilized as an untrusted connection 44. However, the terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. A remote boot system, comprising:
    a mobile computing device;
    a trusted connection; and
    a remote memory storage device;
    wherein, upon an initation of a remote boot process, a boot-time password inserted in firmware of the mobile computing device generates a security key transmitted to the remote memory storage device through the trusted connection, the remote memory storage device utilizes the security key to establish an untrusted connection with the mobile computing device, and the mobile computing device requests bootstrap code through the untrusted connection.

2. The remote boot system of claim 1, wherein the mobile computing device is a portable computer.

3. The remote boot system of claim 1, wherein the mobile computing device is a personal digital assistant.

4. The remote boot system of claim 1, wherein the remote memory storage device is a disk management server.

5. The remote boot system of claim 1, wherein the remote memory storage device is a hard disk drive.

6. The remote boot system of claim 1, wherein the remote memory storage device is an optical disk drive.

7. The remote boot system of claim 1, wherein the remote memory storage device is a tape cartridge.

8. The remote boot system of claim 1, wherein the trusted connection is under the physical control of a user.

9. The remote boot system of claim 1, wherein the trusted connection is a physical connection.

10. The remote boot system of claim 1, wherein the trusted connection is a local area network ("LAN").

11. The remote boot system of claim 10, wherein the local area network utililizes Ethernet.

12. The remote boot system of claim 1, wherein the trusted connection is an infrared communication channel.

13. A method of booting a mobile computer from a remote memory storage device, comprising the steps of:
    creating a trusted connection between the remote memory storage device and a mobile computing device;
    using a boottime password inserted into firmware of the mobile computer to generate a security key on the mobile computing device;
    sending the security key from the mobile computing device to the remote memory storage device through the trusted connection;
    using the security key to establish an untrusted connection between the remote memory storage device and the mobile computing device; and
    using the untrusted connection to transmit bootstrap code from the remote storage device to the mobile computing device.

14. The method of claim 13, further comprising the step of using an operating system residing on the memory storage device to operate the mobile computer.

15. The method of claim 13, wherein the mobile computing device is a portable computer.

16. The method of claim 13, wherein the remote memory storage device is a disk management server.

17. The method of claim 13, wherein the remote memory storage device is a hard disk drive.

18. The method of claim 13, wherein the trusted connection is under the physical control of a user.

19. The method of claim 13, wherein, wherein the trusted connection is a physical connection.

20. The method of claim 19, wherein, wherein the trusted connection is a local area network ("LAN").

21. The method of claim 13, wherein the trusted connection is an infrared communication channel.

22. An article of manufacture including a data storage medium, said data storage medium including a set of machine-readable instructions that are executable by a processing device to implement an algorithm, said algorithm comprising the steps of:
    creating a trusted connection between a remote memory storage device and a mobile computing device;

using a boot-time password inserted into firmware of the mobile computer to generate a security key on the mobile computing device;

sending the security key from the mobile computing device to the remote memory storage device through the trusted connection;

using the security key to establish an untrusted connection between the remote memory storage device and the mobile computing device; and using the untrusted connection to transmit bootstrap code from the remote storage device to the mobile computing device.

23. The article of manufacture of claim 22, further comprising the step of using an operating system residing on the memory storage device to operate the mobile computer.

24. The article of manufacture of claim 22, wherein the mobile computing device is a portable computer.

25. The article of manufacture of claim 22, wherein the remote memory storage device is a disk management server.

26. The article of manufacture of claim 22, wherein the remote memory storage device is a hard disk drive.

27. The article of manufacture of claim 22, wherein the trusted connection is under the physical control of a user.

28. The article of manufacture of claim 22, wherein, wherein the trusted connection is a physical connection.

29. The article of manufacture of claim 28, wherein, wherein the trusted connection is a local area network ("LAN").

30. The article of manufacture of claim 22, wherein the trusted connection is an infrared communication channel.

* * * * *